March 1, 1966
G. HENRY
3,238,033
DEVICE FOR COOLING DRAWN GLASS
Filed July 2, 1962
2 Sheets-Sheet 1
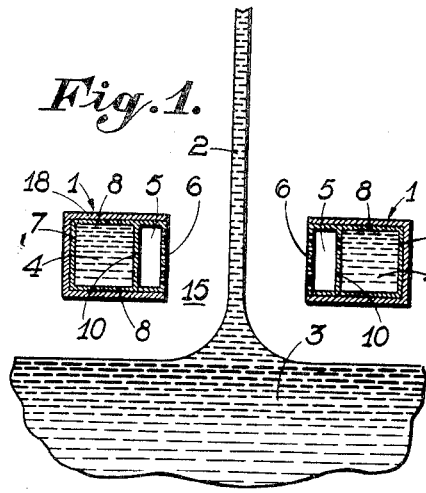
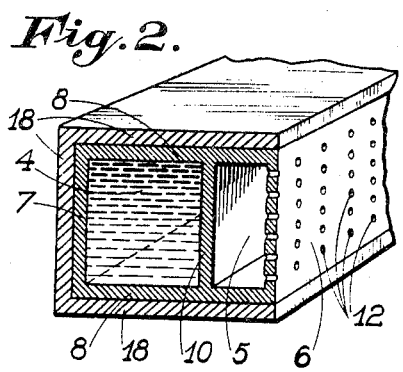
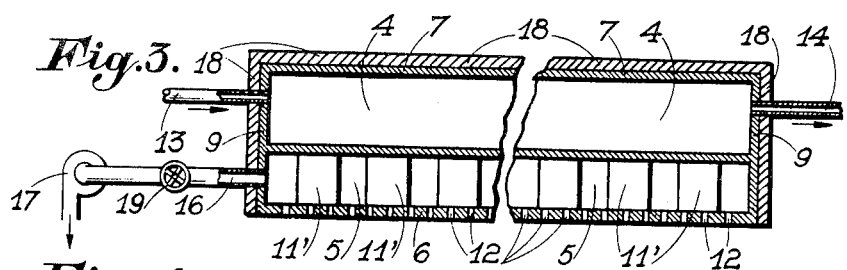
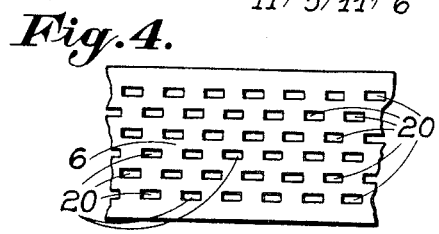
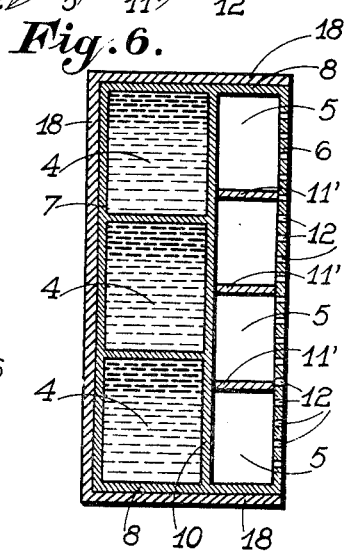
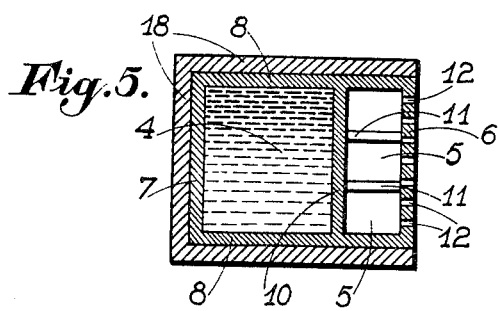
INVENTOR
GEORGES HENRY
BY
Corey, Hart & Stemple
ATTORNEYS March 1, 1966 G. HENRY 3,238,033
DEVICE FOR COOLING DRAWN GLASS
Filed July 2, 1962 2 Sheets-Sheet 2
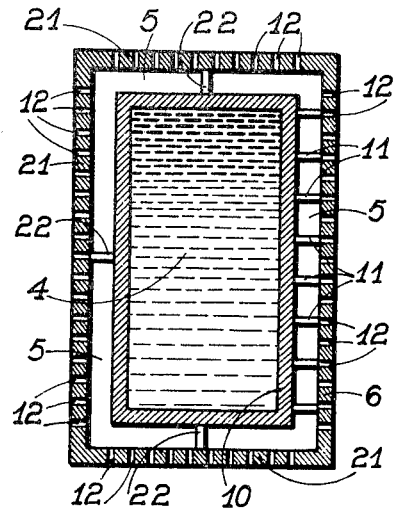
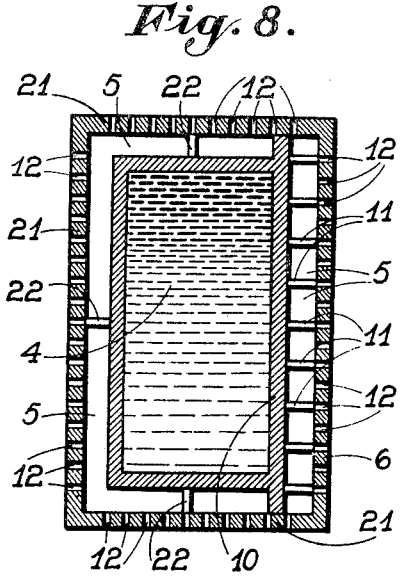
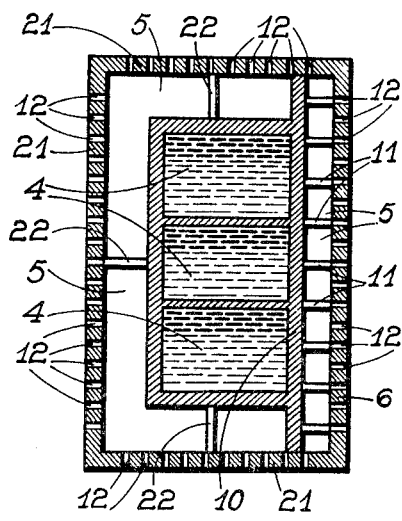
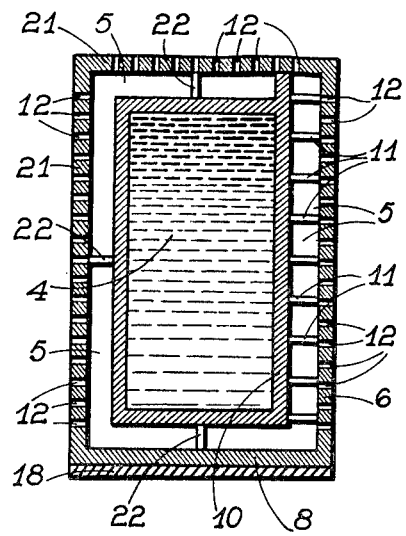
INVENTOR
GEORGES HENRY
BY Corey, Hart & Stemple
ATTORNEY U̇nited States Patent Office 3,238,033
Patented Mar. 1, 1966

3,238,033
DEVICE FOR COOLING DRAWN GLASS
Georges Henry, Jumet, Belgium, assignor to S.A. Glaverbel, Brussels, Belgium, a company of Belgium
Filed July 2, 1962, Ser. No. 206,794
Claims priority, application Belgium, Sept. 6, 1961, 484,408, Patent 607,897
5 Claims. (Cl. 65—204)

The present invention concerns the drawing of glass into sheet form and it has for its object to provide a method of and a device for regularising the cooling and thus improving the quality of the surface of the drawn glass.

In the known methods of producing sheet glass by drawing, the glass is drawn in a drawing chamber from a bath of molten glass. The vertically drawn glass sheet passes between cooling devices horizontally disposed in the drawing chamber at some distance from each face of the sheet and at a short distance from the surface of the glass bath. In some cases, the drawn sheet leaving the drawing chamber penetrates into a vertical annealing chamber in which it slowly cools and at the end of which it is cut. In other cases, the drawn sheet leaving the drawing chamber passes over a folding roll which directs it horizontally into an annealing gallery in order to be cut on leaving the latter.

It is well known that the cold faces of the cooling elements generate cold air currents which descend towards the bulb feeding the drawn glass sheet and thereafter rise along the faces of the latter under the chimney effect existing in the drawing chamber. These currents of cold air become very imperfectly mixed with the ambient hot air and generally take the form of vertical streams of cold air which come into contact with the glass at the place where the sheet is formed and with the sheet, which is still in the plastic state, and create therein local temperature differences which result in an impairment of the surface of the drawn sheet.

Attempts have been made to avoid the formation of cold air currents along the cooling devices by disposing the latter very close to the drawn sheet, but it has been observed, and this is now well known, that this proximity is incompatible with good manufacture.

Various means have been proposed to prevent the currents of cold air from reaching the glass bath and the sheet which is being drawn. Thus, it has been proposed notably to blow hot air against the faces of the sheet or to dispose sources of heat within the drawing chamber so as to create an upward movement of hot air. These methods only incompletely remedy the aforesaid disadvantage, either because the blown hot air entrains streams of cold air against the sheet before it has had time to mix intimately with the said hot air, thus allowing temperature gradients to exist through the sheet, or because the rising currents created by burners do not act only on the cold currents, but also at points where they are not desirable, for example on the sheet itself, thus maintaining conditions which impair the surface of the glass ribbon.

Attempts have also been made to intercept these currents of cold air by means of suction orifices situated in the neighbourhood of the cooling means, but these devices only eliminate a very small part of the said air cones, because, on the one hand, the suction orifices are situated at some distance from the point at which these cold currents are formed and more particularly from that face of the cooling device which is oriented towards the drawn sheet, while on the other hand the negative pressure applied to the suction elements must remain low in order not to cause a dangerous disturbance of the atmosphere in the drawing chamber, notably by means of considerable quantities of cold air introduced from outside the chamber.

In other methods, the suction is localised in a chamber formed, for example, of the drawn sheet, the cooling device and horizontal screens disposed at the top and bottom of the latter and extending in the immediate proximity of the sheet. This system has the serious disadvantage of limiting the height of the sheet subjected to the action of the cooler. In accordance with other methods, the currents of cold air are sucked by a bank disposed on the cooling devices, or the suction bank is combined on the said cooling devices with banks for the admission of currents of hot air. All these methods have the defect that they first allow the cold air currents to be created and then combat them by insufficient means. In addition, even if the cold currents which are formed against the face of the cooling device within the chamber were completely sucked away, further cold currents set up against the outer faces of the chamber, notably against the screens, would descend towards the glass bath and rise along the sheet. Now, since the screens cannot touch the latter, they leave a passage for the parasitic air currents circulating therein at an increased speed and in more intimate contact with the drawn sheet.

In the method according to the present invention, the formation of cold air currents is prevented. For this purpose, the cooled air is sucked from the very outset through the surface of at least one apertured wall of the cooling elements. Preferably, this cold air is sucked through the apertured surface of at least that wall of the cooling elements which is exposed to the radiation of the drawn glass sheet.

A cooling element suitable for carrying out the method according to the invention comprises adjacent longitudinal compartments separated by a common partition, at least one of which compartments is arranged to be traversed by a cooling fluid, while at least one other is arranged to be placed under a slight negative pressure and comprises at least one apertured outer wall so as to suck through the latter the air from the drawing chamber which is in contact therewith. The cooled air is preferably sucked through the apertured surface of at least that wall of the cooling elements which is exposed to the radiation of the drawn glass sheet.

The cooling elements consist of a material which is a good conductor of heat, and the negative pressure compartments advantageously comprise connecting elements, such as cross members or partitions, which are either continuous or discontinuous and which also consist of a material which is a good conductor of heat and are disposed between a partition common to a cooling compartment and an apertured wall, for the purpose of ensuring cooling of the latter by conduction. The outer walls of the cooling elements comprising no apertured surface are preferably covered by a layer of heat-insulating material.

According to the invention, the cooling elements may comprise a number of cooling compartments which are disposed either in series so as to be successively traversed by the cooling fluid, or in parallel. They may also comprise a number of negative pressure compartments connected to the pump creating the negative pressure either by a common duct or by separate ducts provided with valves for separately adjusting the negative pressure of each compartment.

In the simplest embodiment of the invention, the cooling elements consist of a cooling compartment adjacent to a negative pressure compartment having an apertured wall only on the side exposed to the radiation from the drawn glass sheet. In other embodiments, the cooling elements may comprise a number of cooling compartments adjacent to one or more negative pressure compartments having an apertured surface only on the side exposed to the radiation from the glass sheet or also on other walls, the wall or walls of non-apertured surface being heat-insulated, notably the wall exposed to the radiation from the glass bath.

It will readily be appreciated that the cooling elements according to the invention permit of sucking away the air in contact with their cold surfaces without disturbing the atmosphere of the drawing chamber, since, by virtue of the apertured surfaces, the suction apertures distributed therein need have only a small radius of action requiring only a negative pressure whose low value is sufficient to generate undesirable currents in the drawing chamber.

A number of embodiments of the invention are illustrated by way of example in the accompanying drawings.

FIGURE 1 is a vertical section through two cooling elements according to the invention, disposed on either side of a drawn glass sheet, FIGURE 2 is a view in perspective of a cooling element drawn to a larger scale, FIGURE 3 illustrates a horizontal section through an element of the same form, FIGURE 4 is a front view of an apertured wall of a cooling element, and FIGURES 5 to 10 illustrate in vertical sections constructional variants of the cooling elements according to the invention.

According to FIGURE 1, two cooling elements 1 according to the invention are disposed on either side of the sheet 2 drawn from the glass bath 3. These cooling elements, which are illustrated in detailed section in their simplest form in FIGURE 2, consist of two compartments 4 and 5 formed of the longitudinal walls 6, 7, 8, the end walls 9 (FIGURE 5) and the common wall 10. The compartment 4 is arranged to be traversed and cooled by a cooling fluid which, by virtue of the thermal conductivity of the walls 8 and 9, also cools the wall 6 exposed to the radiation from the glass sheet 2. For this purpose, the cooling element is preferably made of a material which is a good conductor of heat, such as, for example, copper. In addition, it is advantageous, for intensifying and rendering uniform the cooling of the wall 6, to connect it to the common wall 10 by cross members 11 (FIGURE 5) or by partitions 11' (FIGURES 3 and 6) of either continuous or discontinuous form, situated at appropriate intervals over the entire surface of the wall 6. The latter is situated facing the drawn sheet 2 and is formed with rows of apertures 12 (FIGURE 2) over its entire surface. Pipes 13 and 14 (FIGURE 3) welded to the end walls 9 of the compartment 4 make it possible to circulate a cooling fluid, for example water, through the interior of the said compartment. The compartment situated opposite to the sheet 2 communicates on the one hand with the atmosphere 15 in the drawing compartment through the apertures 12 and on the other hand with the atmosphere outside the drawing chamber through the pipe 16 connected to the inlet of the fan 17, which maintains a light negative pressure in the compartment 4 so as to suck through the apertures 12 the air which becomes cooled against the wall 6 without disturbing the atmosphere of the drawing compartment. In order to prevent the air in contact with the other walls 7, 8 and 9 from cooling and setting up cold air currents, these walls are covered by a layer of heat-insulating material 18. The value of the negative pressure in the compartment 4 is adjusted by means of a valve 19 connected into the pipe 16. It is to be noted that, as a result of the distribution of the apertures 12 over the entire surface of the wall 6, a very low negative pressure is sufficient to suck the air in contact with the said wall at the instant when it is cooled, without producing in the drawing chamber any undesirable and harmful air movements.

If it is desired to increase the useful surface and the effectiveness of the cooling element, a number of compartments 4 are disposed one above the other as illustrated in FIGURE 6, these compartments being connected in series or in parallel to the circuit of the cooling fluid. Another advantageous arrangement consists in replacing the cross members 11 (FIGURE 5) by continuous partitions so as to form a series of negative pressure compartments which may be connected in series or in parallel to the suction pipe 16. Connection in parallel permits of individually adjusting the negative pressure in each of the compartments by connecting them to the inlet of the fan by separate pipes each provided with a valve.

FIGURE 4 illustrates as a variant another form of aperturing in the wall 6. This aperturing is effected in the form of slots 20 arranged quincuncially, which ensures higher effectiveness of the suction, since the entire vertical line along the wall 6 is interrupted by a number of suction slots.

FIGURES 7 to 10 illustrate other embodiments of the invention in which the compartment or compartments 4 through which the cooling fluid is passed are surrounded by one or more negative pressure compartments 5. The latter comprise apertured suction walls on its longitudinal wall 6, as also on all or some of the walls 21, and if desired even on its end walls 9. The compartments 4 and 5 are maintained in their relative positions by cross members or partitions 22 and, on the side of the wall 6, by cross members 11 or partitions 11'. The thermal connecting elements 11 or 11' are advantageously more numerous and of larger cross-section than the cross members or partitions 22, so as to ensure maximum cooling of the wall 6. For this purpose, the wall 10 may also be made fast with the walls 21 (FIGURES 8 and 9) and the walls 21 of the compartments 5 not exposed to the radiation from the sheet may be disposed at a greater distance from the compartment 4, as illustrated in FIGURE 9. In order that the walls 21 which have no effect on the sheet 2 may be cooled as little as possible, it is desirable to reduce the cross-section and the number of the cross members 22 to the minimum required for good mechanical strength of the assembly and, in order to reduce the influence of the cooling elements on the temperature of the glass bath, it may be advantageous to provide a heat-insulating layer 18 on the wall 8, which is in this case not apertured.

Of course, the invention is not limited to the embodiments which have been described and illustrated by way of example, and modifications may be made thereto without departing from the scope of the invention.

I claim:

1. In combination, in apparatus for drawing a continuous sheet of glass from a bath of molten glass, a cooler unit for cooling the glass sheet arranged in the radiation zone of the glass sheet adjacent to one side of the portion of the glass sheet rising from the bath, said cooler unit comprising cooling means for circulating cooling fluid through the unit, a perforated cooling surface forming part of the unit, being spaced from said cooling means and being constituted of good heat conducting material, and means conductively connecting said cooling surface to said cooling means, said cooling surface being disposed in between said cooling means and the glass sheet so that such cooling surface is exposed within the radiation zone of the glass sheet, and means for withdrawing vacuum through the space between said cooling means and said cooling surface, and through the perforations of said cooling surface, said cooling surface having holes throughout the cooling area thereof in close enough relation to enable air coming into contact therewith to be withdrawn therethrough at the very place it is cooled without creating air currents in the radiation zone of the glass sheet between such cooling surface and the glass sheet, and said withdrawing means exerting a pulling force on the air cooled by such surface as to draw it through the holes in such surface at a rate below that required to create substantial air currents in the radiation zone of the glass sheet between such surface and the glass sheet.

2. The combination defined in claim 1, in which said cooling means comprises a first cooling compartment extending through said unit in the direction of the width of the glass sheet, and means for passing a liquid cooling medium through said cooling compartment, and including a second vacuum compartment having said perforated cooling surface as outer side thereof and forming the space between said cooling means and said cooling surface, said second vacuum compartment and said cooling surface extending in the direction of the width of the glass sheet and being rigidly connected to said first cooling compartment, said two compartments having a common wall separating the same and extending in spaced, substantially parallel relation with said perforated cooling surface and defining with the latter the space through which the vacuum is withdrawn, said common wall being constituted of good heat conducting material, and said connecting means connecting said perforated cooling surface in good heat conducting relation to said common wall.

3. Apparatus as defined in claim 2, in which means within said first cooling compartment subdivides the same into a plurality of adjacent cooling compartments extending in the direction of the width of the glass sheet and arranged vertically one above the other, and said common wall forms a longitudinally extending wall portion for each of said subdivided compartments, and in which said connecting means connects each such wall portion of each of said subdivided compartments in good heat conducting relation to said perforated cooling surface.

4. Apparatus as defined in claim 2, in which means within said second vacuum compartment subdivides the same into a plurality of adjacent vacuum compartments extending in the direction of the width of the glass sheet and arranged vertically one above the other, and said perforated cooling surface forms the exterior wall for all of said subdivided compartments, whereby the cooled air withdrawn through said perforated cooling surface is drawn into each of said subdivided compartments.

5. Apparatus as defined in claim 2 in which said second vacuum compartment wholly encloses said first cooling compartment and includes a plurality of outer perforated cooling surfaces spaced from the walls defining said first cooling compartment to provide a plurality of spaces through which vacuum may be withdrawn, and means mounting said perforated cooling surfaces in such spaced relation to said first cooling compartment walls and connecting each of said cooling surfaces in good heat conducting relation to said first cooling compartment walls, and said withdrawing means withdrawing vacuum through all of the spaces between said first cooling compartment and said perforated cooling surfaces, and through the perforations of the latter.

References Cited by the Examiner
UNITED STATES PATENTS

| 1,656,103 | 1/1928 | Drake | 65—204 |
| 1,741,523 | 12/1929 | Krasnikov | 65—83 |
| 1,756,798 | 4/1930 | Reece | 65—204 |
| 1,830,788 | 11/1931 | Forman | 65—85 |
| 2,598,894 | 6/1952 | Drake | 65—204 |
| 2,607,168 | 8/1952 | Drake | 65—204 |
| 2,608,798 | 9/1952 | Sharp | 65—84 |
| 2,726,486 | 12/1955 | Brichard | 65—84 |

FOREIGN PATENTS 333,844   4/1956   Switzerland.

DONALL H. SYLVESTER, *Primary Examiner.*

F. W. MIGA, *Assistant Examiner.*